US009440228B2

(12) United States Patent
Hosono et al.

(10) Patent No.: US 9,440,228 B2
(45) Date of Patent: Sep. 13, 2016

(54) PEROVSKITE OXIDE CONTAINING HYDRIDE ION, AND METHOD FOR MANUFACTURING SAME

(75) Inventors: Hideo Hosono, Tokyo (JP); Hiroshi Kageyama, Kyoto (JP); Yoji Kobayashi, Kyoto (JP); Mikio Takano, Kyoto (JP); Takeshi Yajima, Kyoto (JP)

(73) Assignee: JAPAN SCIENCE AND TECHNOLOGY AGENCY, Kawaguchi-shi (JP)

( * ) Notice: Subject to any disclaimer, the term of this patent is extended or adjusted under 35 U.S.C. 154(b) by 245 days.

(21) Appl. No.: 14/130,184

(22) PCT Filed: Jul. 5, 2012

(86) PCT No.: PCT/JP2012/067157
§ 371 (c)(1),
(2), (4) Date: Dec. 30, 2013

(87) PCT Pub. No.: WO2013/008705
PCT Pub. Date: Jan. 17, 2013

(65) Prior Publication Data
US 2014/0128252 A1    May 8, 2014

(30) Foreign Application Priority Data
Jul. 8, 2011 (JP) ................. 2011-151738

(51) Int. Cl.
*B01J 39/02* (2006.01)
*B01J 23/00* (2006.01)
(Continued)

(52) U.S. Cl.
CPC ............. *B01J 39/02* (2013.01); *B01J 23/002* (2013.01); *B01J 23/02* (2013.01); *C01B 3/001* (2013.01);
(Continued)

(58) Field of Classification Search
CPC ....................................................... B01J 31/00
See application file for complete search history.

(56) References Cited

FOREIGN PATENT DOCUMENTS

| JP | 2005-100978 A | 4/2005 |
|----|----|----|
| JP | 2006-199578 A | 8/2006 |

(Continued)

OTHER PUBLICATIONS

Kobayashi et al(An oxyhydride of BaTiO3 exhibiting hydride exchange and electronic conductivity, Nature Materials, vol. 11, (2012) pp. 507-511 published online on Apr. 15, 2012).*

(Continued)

*Primary Examiner* — Melvin C Mayes
*Assistant Examiner* — Michael Forrest
(74) *Attorney, Agent, or Firm* — Westerman, Hattori, Daniels & Adrian, LLP

(57) ABSTRACT

[Problem] Many oxide-ion conductors exhibit high functionality at high temperatures due to the large weight and charge of oxide ions, and it has been difficult to achieve the functionality at low temperatures.
[Solution] A perovskite oxide having hydride ion conductivity, at least 1 at % of the oxide ions ($O^{2-}$) contained in a titanium-containing perovskite oxide being substituted with hydride ions ($H^-$). This oxide, in which negatively charged hydride ions ($H^-$) are used for the ionic conduction, has both hydride ion conductivity and electron conductivity. As a starting material, the titanium-containing perovskite oxide is kept together with a powder of an alkali metal or alkaline-earth metal hydride selected from LiH, $CaH_2$, $SrH_2$, and $BaH_2$ in a temperature range of 300° C. or higher and lower than the melting point of the hydride in a vacuum or an inert gas atmosphere to substitute some of the oxide ions in the oxide with the hydride ions, resulting in the introduction of the hydride ions into oxygen sites.

6 Claims, 5 Drawing Sheets

(51) Int. Cl.
  *C01B 3/00* (2006.01)
  *C01B 3/50* (2006.01)
  *C01G 23/00* (2006.01)
  *H01M 4/90* (2006.01)
  *B01J 23/02* (2006.01)

(52) U.S. Cl.
  CPC ............. *C01B 3/503* (2013.01); *C01G 23/003* (2013.01); *C01G 23/005* (2013.01); *C01G 23/006* (2013.01); *H01M 4/9033* (2013.01); *C01P 2002/34* (2013.01); *C01P 2002/72* (2013.01); *C01P 2004/52* (2013.01); *C01P 2006/32* (2013.01); *C01P 2006/40* (2013.01); *Y02E 60/324* (2013.01); *Y02E 60/50* (2013.01)

(56) References Cited

FOREIGN PATENT DOCUMENTS

| | | |
|---|---|---|
| JP | 2007-220406 A | 8/2007 |
| JP | 4219821 B2 | 2/2009 |
| JP | 4374631 B2 | 12/2009 |
| WO | 03-089373 A1 | 10/2003 |
| WO | 2010/105787 A1 | 9/2010 |

OTHER PUBLICATIONS

Yajima et al(Epitaxial Thin Films of ATiO3-xHx (A = Ba, Sr, Ca) with Metallic Conductivity, J Am Chem Soc 2012, 134, 8782-8785 published on May 7, 2012).*
Poeppelmeier (A Mixed Oxide-Hydride Perovskite, Science, vol. 295 (2002) p. 1849).*
Poulsen (Speculations on the existence of hydride ions in proton conducting oxides, Solid State Ionics 145 (2001) 387-397).*
International Search Report, dated Oct. 2, 2012, corresponding application No. PCT/JP2012/067157.
Ohkoshi, Shin-ichi, et al., "Synthesis of metal oxide with a room temperature photoreversible phase transition", Nature Chemistry, Macmillan Publishers Limited., 2010, vol. 2, pp. 539-545, cited in Specification.
Gong, Wenhe, et al., "Oxygen-Deficient SrTiO3-x, X = 0.28, 0.17, and 0.08. Crystal Growth, Crystal Structure, Magnetic, and Transport Properties", Journal of Solid State Chemistry 90, Academic Press, Inc., 1991, pp. 320-330, cited in Specification.
Steinsvik, Svein, et al., "Hydrogen ion conduction in iron-substituted strontium titanate, SrTi1-xFexO3-x/2(0≤x≤0.8)", Solid State Ionics 143, Elsevier Science B.V., 2001, pp. 103-116, cited in Specification.
Hayashi, Katsuro, et al., "Light-induced conversion of an insulating refractory oxide into a persistent electronic conductor", Nature, Nature Publishing Group, Oct. 3, 2002, vol. 419, pp. 462-465, cited in Specification.
Malaman, B. et al., "Etude structurale de l'hydruro-oxyde LaHO par diffraction des rayons X et par diffraction des neutrons", Journal of Solid State Chemistry 53, Academic Press Inc., 1984, pp. 44-54, cited in Specification.
Hayward, M. A., et al., "The Hydride Anion in an Extended Transition Metal Oxide Array: LaSrCoO 3H0.7", Science, American Association for the Advancement of Science, USA, 2002, vol. 295, pp. 1882-1884, cited in Specification.
Bridges, Craig, A., et al., "Observation of Hydride Mobility in the Transition-Metal Oxide Hydride LaSrCoO3H0.7", Advanced Materials, Wiley-VCH Verlag GmbH & Co. kGaA, Weinheim, 2006, 18, pp. 3304-3308, cited in Specification.
Helps, Rebecca, M., et al., "Sr3Co2O4.33H0.84:An Extended Transition Metal Oxide-Hydride", Inorganic Chemistry, American Chemical Society, 2010,49, pp. 11062-11068, cited in Specification.
Waser, R., "Solubility and diffusivity of hydrogen defects in BaTiO3 ceramics, Science of Ceramics", 1988, vol. 14, pp. 383-388, cited in ISR.

* cited by examiner

PEROVSKITE OXIDE CONTAINING HYDRIDE ION, AND METHOD FOR MANUFACTURING SAME

TECHNICAL FIELD

The present invention relates to a titanium-containing perovskite oxide, in particular, a titanium-containing perovskite oxide having hydride ion conductivity, a method for manufacturing the oxide, and the use of the oxide.

BACKGROUND ART

For example, titanium-containing oxides having a perovskite crystal structure or a layered perovskite crystal structure, which are represented by $MTiO_3$ (M represents Ca, Ba, Mg, Sr, or Pb) and titanium-containing oxides in which some of Ti atoms are substituted with at least one type of Hf and Zr (PTL 1) (collectively referred to as "titanium-containing perovskite oxides") have a considerably high relative dielectric constant. Therefore, the titanium-containing perovskite oxides have been eagerly studied for a long time as devices such as capacitor materials and dielectric films and also in terms of applications to substrate materials of other perovskite transition metal oxides and nonlinear resistors.

In addition to the excellent characteristics, the fact that titanium is an element which has a low environmental load, is safe for living bodies, and is abundant on the earth facilitates the use of titanium-containing perovskite oxides for biocompatible materials and the industrial use of titanium-containing perovskite oxides for electronic materials, optical materials, and the like. Among Clarke numbers, which represent the proportions of elements present in the earth's crust, titanium is in tenth place among all elements and in second place after iron among transition metals.

It is known that titanium compounds in which the valences of Ti are +4 ($3d^0$) and +3 ($3d^1$) are stably present. The material development of titanium-containing oxides that uses the conductivity of such d electrons has been eagerly conducted. For example, Nb-doped anatase ($TiO_2$) is promising as a transparent electrode material, and $Ti_4O_7$ known as one of Magneli phases is promising as a switching material (NPL 1) because $Ti_4O_7$ exhibits a metal-insulator transition.

It is known that, by forming oxygen defects (vacancies) in an insulative titanium-containing perovskite oxide, that is, by doping the insulative titanium-containing perovskite oxide with electrons, a mixed valence state with titanium having valences of +3 and +4 is achieved and thus the insulative titanium-containing perovskite oxide can be converted into a material with low electrical resistance (NPL 2). To achieve this, various methods such as a heat treatment at high temperature in vacuum, in hydrogen, in nitrogen, or in argon gas, using an oxygen getter are employed.

Regarding oxides, an increasing number of studies have been conducted on, for example, an oxide-ion mixed conductor (PTL 2) and an electrochemical device including a material having proton ($H^+$) ion conductivity as a solid electrolyte (PTL 3). On the other hand, almost no studies have been conducted on negatively charged hydride ions ($H^-$). The possibility that hydrogen in an oxide is conducted in the form of hydride ions was proposed by S. Steinsvik et al. in 2001 (NPL 3). However, there are opposing opinions on this theory and its validity is still disputed.

In general, the compatibility between oxide ions and hydride ions is very poor. Therefore, successful examples in which hydride ions are inserted into an oxide in an amount exceeding the amount of oxygen defects are limited to only a small number of substances that use typical elements. Examples of such substances include LaHO (NPL 4) and $12CaO\cdot7Al_2O_3$ (NPL 5 and PTL 4).

In 2002, M. A. Hayward et al. succeeded in synthesizing a cobalt oxide-hydride containing hydride ions, $LaSrCoO_3H_{0.7}$ (NPL 6). After that, in 2006, C. A. Bridges et al. reported the diffusion phenomenon of hydride ions in the cobalt oxide $LaSrCoO_3H_{0.7}$ (NPL 7). This indicates that hydride ions in the substance have mobility, but does not indicate a chemical reaction with the ambient atmosphere (e.g., gaseous phase). The ion conductivity is unknown. Furthermore, R. M. Helps et al. reported a cobalt oxide-hydride having a structure similar to that of the substance, $Sr_3Co_2O_{4.33}H_{0.84}$ (NPL 8). These two substances are the first examples in which a large amount of hydride ions were taken into a transition metal oxide.

PTL 1: Japanese Unexamined Patent Application Publication No. 2006-199578
PTL 2: Japanese Patent No. 4374631
PTL 3: Japanese Unexamined Patent Application Publication No. 2005-100978
PTL 4: Japanese Patent No. 4219821
NPL 1: S. Ohkoshi et al., "Nature Chemistry" 2, p. 539-545 (2010)
NPL 2: W. Gong et al., "Journal of Solid State Chemistry" 90, p. 320-330 (1991)
NPL 3: S. Steinsvik et al., "Solid State Ionics" 143, p. 103-116 (2001)
NPL 4: K. Hayashi et al., "Nature" 419, p. 462-465 (2002)
NPL 5: B. Malaman, J. F. Brice, Journal of Solid State Chemistry" 53, p. 44-54 (1984)
NPL 6: M. A. Hayward et al., "Science" 295, p. 1882-1884 (2002)
NPL 7: C. A. Bridges et al., "Advanced Materials" 18, p. 3304-3308 (2006)
NPL 8: R. M. Helps et al., "Inorganic Chemistry" 49, p. 11062-11068 (2010)

SUMMARY OF INVENTION

Technical Problem

The most developed ion conductor that uses negative ions is an oxide-ion conductor. However, many oxide-ion conductors exhibit high functionality at high temperatures due to the large weight and charge of oxide ions, and it has been difficult to achieve the functionality at low temperatures. As a result of the recent depletion of petroleum resources and the recent demand for improving environmental pollution, opportunities for effectively using hydrogen resources which provide clean energy have been increasing. Thus, the development of ion conductors that use hydride ions and are composed of elements safe for living bodies has been demanded.

Since applications such as an electrode are considered to have both ion conductivity and electron conductivity, a substance containing a transition metal is required. Cobalt has a valence of 2 or more in typical oxides. However, in the cobalt oxide-hydrides, which are only examples shown in PTLs 6 and 7, cobalt is in an extremely low oxidation state with monovalent ions and thus the cobalt oxide-hydrides are unstable. Theoretical calculation has shown that the d electrons of cobalt are localized, and thus there is no electron conductivity. Furthermore, cobalt is a rare metal and has toxicity in some cases. These facts pose a problem when cobalt is applied to an electrode or the like.

Transition metal oxides are considered to be applied to, for example, batteries that use the conduction of hydride ions. To achieve this, a transition metal oxide having both ion conductivity and electron conductivity is required. However, known cobalt oxide-hydrides have many disadvantageous factors such as the rarity of cobalt ions, toxicity, the instability derived from an extremely low oxidation state with monovalent ions, and the lack of electron conductivity due to strong electron correlation. Therefore, a hydride ion/electron mixed conductor that is composed of a metal oxide containing an abundant element having a stable oxidation number, such as titanium, needs to be developed. In addition, a novel ceramic material having excellent hydrogen absorption/desorption characteristics needs to be developed in order to effectively use hydrogen.

Solution to Problem

The inventors of the present invention have found that a Ti-containing perovskite oxide can take in hydride ions ($H^-$) in a low concentration to a high concentration under particular heat treatment conditions; the obtained Ti-containing perovskite oxide containing hydride ions has both hydride ion conductivity and electron conductivity; and the obtained Ti-containing perovskite oxide containing hydride ions has excellent characteristics such as reactivity with an outside hydrogen gas at a low temperature of about 450° C. or lower, that is, ion conductivity. The Ti-containing perovskite oxide containing hydride ions is defined as "a Ti-containing perovskite oxide-hydride". The present invention is as follows.

The present invention is a perovskite oxide having hydride ion conductivity, which has a novel composition that provides specific and useful characteristics. In the perovskite oxide, 1 at. % or more of oxide ions contained in a titanium-containing perovskite oxide are substituted with hydride ions ($H^-$).

The oxide can be manufactured in the form of powder by preparing a titanium-containing perovskite oxide powder as a starting material and keeping the titanium-containing perovskite oxide powder together with a powder of an alkali metal or alkaline-earth metal hydride selected from lithium hydride (LiH), calcium hydride ($CaH_2$), strontium hydride ($SrH_2$), and barium hydride ($BaH_2$) in a temperature range of 300° C. or higher and lower than a melting point of the hydride in a vacuum or an inert gas atmosphere to substitute some of oxide ions in the oxide with hydride ions.

The oxide can also be manufactured in the form of a thin film by preparing a titanium-containing perovskite oxide thin film as a starting material and keeping the titanium-containing perovskite oxide thin film together with a powder of an alkali metal or alkaline-earth metal hydride selected from lithium hydride (LiH), calcium hydride ($CaH_2$), strontium hydride ($SrH_2$), and barium hydride ($BaH_2$) in a temperature range of 300° C. or higher and lower than a melting point of the hydride in a vacuum or an inert gas atmosphere to substitute some of oxide ions in the oxide with hydride ions.

This oxide is useful as a mixed conductor having both hydride ion conductivity and electron conductivity. A ceramic electrode requires the permeability of hydrogen ions and electron conductivity, but this oxide can be used as a hydrogenation catalyst and an electrochemical device such as a hydrogen electrode, a hydrogen permeation membrane, or a hydrogen gas sensor. This oxide can also be used as a hydrogen absorption/desorption material. Furthermore, it may be difficult to combine a material in an abnormally low valence state, such as cobalt in a cobalt oxide-hydride, with other materials. However, the Ti-containing perovskite oxide-hydride of the present invention has a mixed valence state in which the valences of titanium are +3 and +4, and therefore is easily combined with other materials using electron conductivity.

Advantageous Effects of Invention

The present invention provides a specific compound that uses, for ion conduction, negatively charged hydride ions ($H^-$) which have received scant attention, that is, an oxide in which some of oxide ions ($O^{2-}$) of a titanium-containing perovskite oxide are substituted with hydride ions. Since this oxide is an environmentally-friendly inexpensive titanium-based oxide and has excellent characteristics such as mixed conductivity including both hydride ion conductivity and electron conductivity, the oxide is useful as a material for electronic devices that can exhibit functionality at low temperatures. Furthermore, the oxide is useful as a novel hydrogen absorption/desorption material.

DESCRIPTION OF EMBODIMENTS

Figure 1:
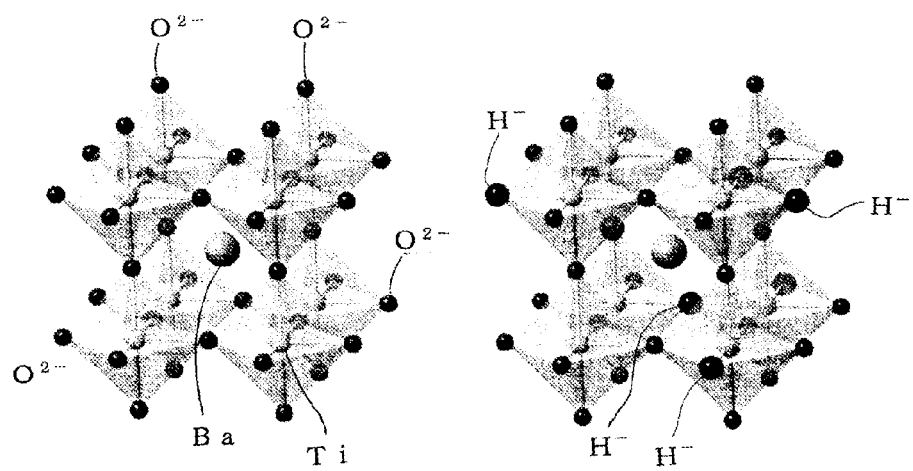
FIG. 1 illustrates the crystal structure (left) of $BaTiO_3$ before a heat treatment and the crystal structure (right) of a sample a after the heat treatment in Example 1.

Perovskite oxides are generally represented by $ABO_3$, $A_2BO_4$, and $A_3B_2O_7$. These oxides are collectively represented by General formula $A_{n+1}B_nO_{3n+1}$ (where n represents 1, 2, or ∞). In the present invention, a starting material contains Ti as the B component and can be represented by Formula I below. (Formula I) $M_{n+1}Ti_nO_{3n+1}$ (where n represents 1, 2, or ∞). That is, when n=1, the starting material is $M_2TiO_4$. When n=2, the starting material is $M_3Ti_2O_7$. When n=∞, the starting material is substantially $MTiO_3$. M typically represents at least one of Ca, Ba, Sr, Pb, and Mg, but is not limited to these divalent positive ions. The starting material can be a solid solute containing cations having different valences, such as La and Na, and can contain deficient. The Ti site may also be partly substituted with another transition metal such as Hf or Zr.

The starting material is preferably in the form of powder. In the case of $MTiO_3$, the starting material may be in the form of a thin film deposited on a substrate. Any substrate composed of a material that withstands a heat treatment temperature may be used as the substrate for the $MTiO_3$ thin film. The $MTiO_3$ thin film may be a single crystal thin film or a polycrystalline thin film. A substrate suitable for the $MTiO_3$ single crystal thin film is a $(LaAlO_3)_{0.3}(SrAl_{0.5}Ta_{0.5}O_3)_{0.7}$ (abbreviated as LSAT) substrate.

The starting material $M_{n+1}Ti_nO_{3n+1}$ is synthesized by causing a solid-phase reaction of a raw material containing M and Ti at an atomic equivalent ratio of n+1:n in the air or an oxidizing atmosphere at a firing temperature of 800° C. or higher and lower than 1500° C. The raw material is typically a carbonate of M and titanium oxide. The starting material can also be obtained by a method that uses an aqueous solution, such as a hydrothermal method or a sol-gel method. These methods are publicly known and can be appropriately employed. The starting material is also available in market in the form of powder.

The $MTiO_3$ thin film is formed on a substrate such as an LSAT substrate by a pulsed laser deposition (PLD) method using an $MTiO_3$ sintered body as a target. The film formation method is not limited to the PLD method, and a vapor deposition method such as a sputtering method or a plasma splaying method can also be used. These methods are also publicly known and can be appropriately employed.

An alkali metal or alkaline-earth metal hydride selected from lithium hydride (LiH, melting point 680° C.), calcium hydride ($CaH_2$, melting point 816° C.), strontium hydride ($SrH_2$, melting point 675° C.), and barium hydride ($BaH_2$, melting point 675° C.) is used to extract some of oxide ions contained in the starting material and substitute the oxide ions with hydride ions ($H^-$). These hydrides have similar characteristics in the form of ionic hydrides. The reason why the ionic hydrides can be used to substitute oxide ions with hydride ions is considered to be as follows. These substances have not only the capability to extract oxygen from a Ti-containing perovskite oxide but also the capability to supply hydride ions to oxygen sites from which oxygen has been extracted, even in the case where heating is performed in a solid state, that is, at a low temperature equal to or lower than the melting point. Therefore, hydride ions are inserted without introducing oxygen defects in the starting material in advance. In the manufacturing method of the present invention, an insertion/substitution reaction of hydride ions produced as a result of the dissociation of the ionic hydride occurs at a relatively low temperature, and thus the structural skeleton of the starting material is not broken. Furthermore, a deoxidation reaction and an insertion reaction of a large amount of hydride ions can be topochemically achieved at the same time, which provides an easy manufacturing process.

Hereinafter, the case where a $CaM_2$ powder is used will be described, but the above-described other hydride powders can also be used. The $M_{n+1}Ti_nO_{3n+1}$ powder or the $MTiO_3$ thin film serving as the starting material is heat-treated by being kept in an atmosphere containing a $CaM_2$ powder at 200° C. or higher and lower than the melting point (816° C.) of $CaM_2$, desirably 300° C. or higher and 600° C. or lower and then cooled to room temperature. The temperature-increasing rate and the temperature-decreasing rate are not limited. The time required for the heat treatment may be about one hour or longer though depending on the temperature.

The atmosphere containing the $CaH_2$ powder may be created by simultaneously vacuum-sealing the $CaH_2$ powder and the powder compact of $M_{n+1}Ti_nO_{3n+1}$ or the thin film sample serving as the starting material in a thermally and chemically durable container such as quartz glass or a stainless steel tube. The atmosphere in the sealed tube may be an inert gas such as argon or nitrogen instead of vacuum. The reaction may be caused while performing vacuuming using a vacuum pump. However, since the ionic hydride such as $CaH_2$ strongly reacts with water, it is required that moisture is not continuously supplied to the atmosphere in the sealed tube through a channel of the vacuum pump. The oxygen gas and moisture present in a reaction system in the sealed tube before the reaction can be removed by using an excessive amount of $CaH_2$ that reacts with the oxygen gas and moisture.

$CaH_2$ and $M_{n+1}Ti_nO_{3n+1}$ exhibit high reactivity when they are in contact with each other in the container, but still exhibits reactivity when they are not in contact with each other. In the case where they are not in contact with each other, the temperature of a position at which the $M_{n+1}Ti_nO_{3n+1}$ is inserted and the temperature of a position at which the $CaH_2$ is inserted can be independently controlled. The reaction can be caused to proceed while preventing the decomposition of the $M_{n+1}Ti_nO_{3n+1}$ and thus the temperature of the position at which the $CaH_2$ is inserted can be increased to near the melting point of $CaH_2$. Note that, when $CaH_2$ and $M_{n+1}Ti_nO_{3n+1}$ are not in contact with each other, a longer time is required for the heating.

The $CaH_2$ reacts with oxygen contained in the $M_{n+1}Ti_nO_{3n+1}$ to form calcium oxide (CaO). This formation causes hydrogenation in which hydrogen atoms generated as a result of the decomposition of the $CaH_2$ occupy all or some of oxygen vacancies formed in the $M_{n+1}Ti_nO_{3n+1}$, and at the same time a hydrogen gas is generated in the reaction atmosphere.

The oxygen extraction from the $M_{n+1}Ti_nO_{3n+1}$ and the hydrogenation reaction in the $M_{n+1}Ti_nO_{3n+1}$ proceed more quickly as the amount of $CaH_2$ used increases, the heat treatment time lengthens, and the heat treatment temperature increases. The oxygen extraction and the hydrogenation reaction can also be caused to proceed quickly by decreasing the size of the $M_{n+1}Ti_nO_{3n+1}$ powder sample or decreasing the thickness of the $MTiO_3$ thin film. When the amount of $CaH_2$ is not sufficiently large, the heat treatment time is short, or the heat treatment temperature is low, the oxygen extraction and the hydrogenation reaction proceed slowly and thus an $M_{n+1}Ti_nO_{3n+1}$ oxide containing high-concentration hydride ions cannot be produced. As described above, the amount of hydrogen taken into the $M_{n+1}Ti_nO_{3n+1}$ varies depending on the factors such as the amount of $CaH_2$, the heat treatment time, the heat treatment temperature, the size of particles, and the form. Therefore, these factors are referred to as "hydridization-ability-determining factors".

If the heat treatment temperature exceeds 650° C., the $M_{n+1}Ti_nO_{3n+1}$ decomposes and an impurity such as $TiH_2$ is generated. Therefore, a single-phase $M_{n+1}Ti_nO_{3n+1}$ oxide containing hydride ions cannot be formed. As described in Examples, the sample $BaTiO_3$ before the heat treatment has, at room temperature, a tetragonal perovskite structure which is distorted from an ideal cubic perovskite structure because of the ferroelectricity caused by the unoccupied d orbitals of titanium. On the other hand, the sample after the heat treatment has only a cubic perovskite structure at room temperature because electrons are injected to the d orbitals of titanium through the substitution between oxide ions and hydride ions.

As the heat treatment time lengthens, the amount of and thus the amount of calcium oxide generated increases. The reaction proceeds as long as an excessive amount of $CaH_2$ is present, but hydrogen cannot be inserted in a concentration that exceeds the maximum concentration in which hydrogen can be taken in the $M_{n+1}Ti_nO_{3n+1}$. Through the above heat treatment, up to 20 at. % of oxygen can be substituted with hydrogen. When the amount of substituted oxygen is 1 at. % or more, the hydride ion conductivity can be achieved. The hydride ion conductivity increases in proportion to the amount of substituted oxygen. Therefore, 5 at. % or more of oxygen is preferably substituted and 10 at. % or more of oxygen is more preferably substituted.

In the case of the powder sample, the hydrogen concentration in the $M_{n+1}Ti_nO_{3n+1}$ oxide can be determined by powder X-ray diffraction, powder neutron diffraction, a decomposition experiment in an acid solution such as HCl, a combustion experiment in a reducing atmosphere, quadrupole mass spectrometry, or a change in magnetic susceptibility as a function of temperature. In the case of the thin film sample, the hydrogen concentration can be determined with a secondary ion mass spectrometer (SIMS).

The Ti-containing perovskite oxide-hydride obtained by the above-described method is a substance in which up to 20 at. % of oxygen in oxygen sites is substituted with hydrogen. That is, the substance can be represented by Basic formula II below.

(Basic formula II) $M_{n+1}Ti_n(O_{1-x}H_x)_{3n+1}$ (where M is the same as that of the starting material, H represents hydride ions substituted for oxygen ions, $0.01 \leq x \leq 0.2$, n represents any one of 1, 2, and $\infty$).

The hydrogen subjected to the substitution randomly (statistical manner) occupies oxygen sites. However, by controlling any of the hydridization-ability-determining factors, a gradient can be provided to the hydrogen concentration distribution from the surface of the powder or thin film to its center.

The electrical resistance of the obtained Ti-containing perovskite oxide-hydride decreases with increasing the concentration of hydride ions contained therein. In the case of the powder sample, it is difficult to qualitatively and quantitatively estimate the electrical resistance due to the contact resistance. In the case of the thin film sample, the Ti-containing perovskite oxide-hydride has an electrical resistivity of $10^{-2}$ Ωcm or less at room temperature and exhibits positive temperature dependence, that is, a metallic behavior.

The Ti-containing perovskite oxide-hydride of the present invention is a mixed conductor having both hydride ion conductivity and electron conductivity. In terms of such characteristics, the Ti-containing perovskite oxide-hydride is useful for electrode catalysts and hydrogen permeation membranes of solid-electrolyte fuel cells, hydrogen gas-generating apparatuses that use water electrolysis, and the like and solid electrolytes of fuel cells and hydrogen gas sensors.

When the Ti-containing perovskite oxide-hydride obtained by the above method is heated to 300° C. or higher in an atmosphere containing a deuterium gas, the hydrogen in the oxide is exchanged for the deuterium gas in the atmosphere, and the deuterium is migrated in the oxide.

The exchange reaction with an outside hydrogen gas proceeds at a relatively low temperature of about 300° C. in the Ti-containing perovskite oxide-hydride of the present invention compared with common oxide-ion conductors. This is because hydride ions (H⁻) are lighter than oxide ions ($O^{2-}$) and the charge of the hydride ions is half the charge of the oxide ions. The exchange reaction proceeds more quickly as the amount of hydride ions contained in the oxide-hydride increases and the heating temperature increases. At a heating temperature equal to or higher than the threshold temperature that is determined by the type of M and the value n in the $M_{n+1}Ti_nO_{3n+1}$ the exchange reaction still proceeds, but the oxide starts to decompose. At a heating temperature lower than the threshold temperature, the hydrogen concentration in the oxide-hydride does not change, but a slight amount of hydrogen may be desorbed.

The Ti-containing perovskite oxide-hydride of the present invention can also be used as a hydrogen absorption/desorption material. When the temperature of the Ti-containing perovskite oxide-hydride is increased in an atmosphere not containing a hydrogen gas, a hydrogen gas is desorbed at about 400° C. or higher. In general, in the hydrogenation of alkenes and alkynes and the catalytic reaction in which methanol is synthesized from CO, a first stage at which a hydrogen molecule $H_2$ is adsorbed and the hydrogen molecule is dissociated into a single atom H is required. A precious metal such as Pt or Pd has been used to perform the above process. However, the Ti-containing perovskite oxide-hydride also generates a H⁻ species in a hydrogen gas. Therefore, the same catalytic activity is achieved with use of an inorganic material not containing a precious metal. The substance after the hydrogen desorption can absorb hydrogen again through the reaction with $CaH_2$ while keeping its form.

The Ti-containing perovskite oxide-hydride of the present invention exhibits high thermal stability and chemical stability. The Ti-containing perovskite oxide-hydride is stable in the air, stable against water and an alkali solution, and even stable against boiling water. However, in a strong acid, the Ti-containing perovskite oxide-hydride desorbs hydrogen while being decomposed.

EXAMPLE 1

The present invention will now be further described in detail based on Examples. Barium titanate ($BaTiO_3$) particles having a particle size in the range of 100 nm to 200 nm and synthesized by a synthesis method that uses a solution, such as a citric acid method, were heat-treated at about 200° C. to remove moisture attached to the surfaces of the particles. Subsequently, three equivalents of $CaH_2$ powder and the $BaTiO_3$ particles were mixed with each other in a glove box and molded into a pellet using a hand press. The pellet was inserted into a quartz tube having an internal volume of about 15 cm³ and vacuum-sealed. Three samples were heat-treated under the heat treatment conditions shown in Table 1 to cause a hydrogenation reaction. The samples after the heat treatment were treated with a 0.1 M $NH_4Cl$ methanol solution to remove an unreacted $CaH_2$ and a by-product CaO that were attached to a product.

TABLE 1

| Sample No. | Heat treatment temperature (° C.) | Heat treatment time (h) | Composition |
| --- | --- | --- | --- |
| a | 580 | 150 | $BaTi(O_{0.8}H_{0.2})_3$ |
| b | 540 | 100 | $BaTi(O_{0.9}H_{0.1})_3$ |
| c | 500 | 100 | $BaTi(O_{0.97}H_{0.03})_3$ |

The color of the samples washed with a 0.1 M $NH_4Cl$ methanol solution is light blue under the conditions for the hydrogenation reaction providing weak hydrogenation power and becomes black as stronger hydrogenation power is provided. The obtained samples were found to maintain a perovskite crystal structure by powder X-ray diffraction or powder neutron diffraction. The samples a, b, and c before the heat treatment had, at room temperature, a tetragonal perovskite structure which was distorted from an ideal cubic perovskite structure because of the ferroelectricity. On the other hand, the samples after the heat treatment had only a cubic perovskite structure at room temperature.

It was confirmed by Rietveld analysis that the obtained samples had the compositions shown in Table 1. Note that there is a possibility that less than 5 at. % of oxygen defects are present in each of the samples. It was confirmed by the measurement of (the valence of titanium by) magnetic susceptibility, the quadrupole mass spectrometry, the thermogravimetric analysis, and the decomposition experiment that the oxygen content and the hydrogen content in each of the samples that were determined by the diffraction experiment were correct. FIG. 1 illustrates the determined crystal structure (right) of the sample a after the heat treatment together with the crystal structure (left) of $BaTiO_3$ before the heat treatment. In the $BaTiO_3$ after the heat treatment, some of oxide ions are substituted with hydride ions.

It was also found that, also in other $M_{n+1}Ti_nO_{3n+1}$ oxides with M representing Ca, Sr, and Pb, the same hydrogenation phenomenon occurred when the same heat treatment conditions were applied, that is, up to about 20 at. % of oxygen in oxygen sites was substituted with hydrogen.

Figure 2:
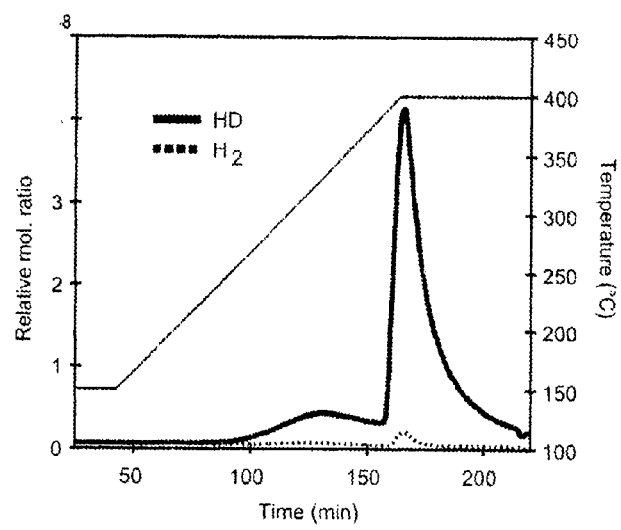
FIG. 2 illustrates change in the concentrations of $H_2$ and HD detected in a gaseous phase when the sample a in Example 1 was heated-up from room temperature while deuterium was caused to flow.

FIG. 2 illustrates change in the concentrations of $H_2$ gas and hydrogen deuteride (HD) gas detected with a quadrupole mass spectrometer when 1.2 g of the sample a was heated from room temperature to 400° C. over about 160 minutes while a gas (5 vol %, $D_2/Ar$) containing a deuterium gas was caused to flow at a flow rate of 30 mL/min. A trace amount of HD was detected from about 250° C. due to the exchange between hydrogen in the sample and deuterium in the gaseous phase. At a temperature exceeding 350° C., the exchange rate suddenly increased.

Figure 3:
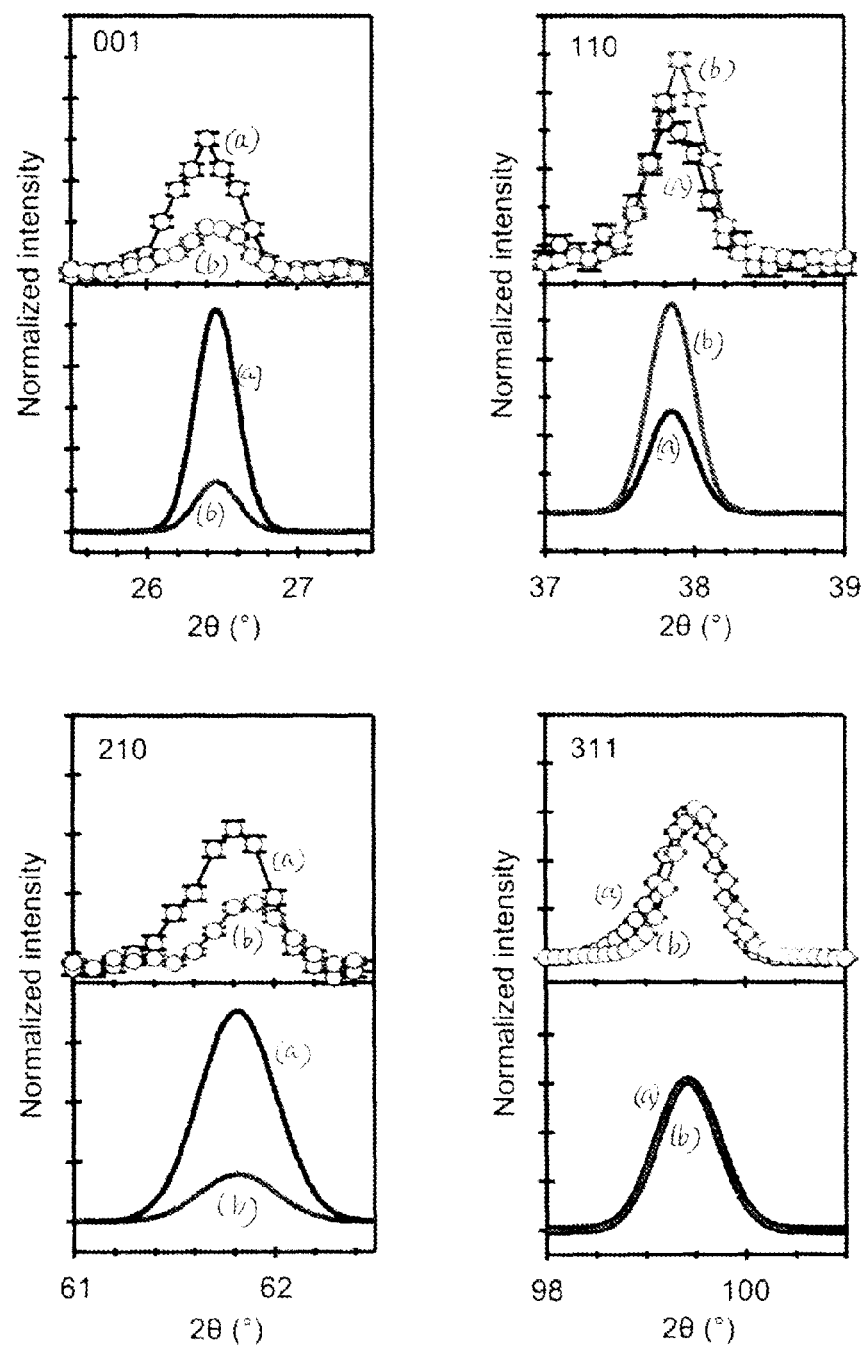
FIG. 3 illustrates the neutron diffraction intensity (top) and the calculation pattern (bottom) of the sample a in Example 1 and a sample b after the heat treatment in a deuterium gas in terms of typical diffraction peaks.

FIG. 3 illustrates the neutron diffraction intensity (top) and the calculation pattern (bottom) of the sample a and the sample b after the heat treatment in the deuterium gas. FIG. 3 shows that hydrogen (H) in the sample a is quickly exchanged for deuterium ($D_2$) not only on the surface but also over the entire sample. This phenomenon indicates that hydride ions are capable of being conducted in a thin film.

The same phenomenon also occurred in other $M_{n+1}Ti_nO_{3n+1}$ oxides with M representing Ca, Sr, and Pb. As is clear from the measurement results of the electrical resistance of the sample obtained in Example 2 below, the Ti-containing perovskite oxide-hydride of the present invention has high electron conductivity and thus it is difficult to measure the ion conductivity. However, the occurrence of the same phenomenon provides a clue as to the fact that the Ti-containing perovskite oxide-hydride has high ion conductivity at high temperatures.

EXAMPLE 2

An $MTiO_3$ (M=Ba, Sr, or Ca) single crystal thin film having an area of 1 cm×1 cm and a thickness of 120 nm was deposited as a sample on an LSAT substrate by a PLD method described below. An $MTiO_3$ (M=Ba, Sr, or Ca) pellet was used as a target. The temperature of the substrate was 700° C., the oxygen pressure during the deposition was 0.05 Pa, and a KrF excimer laser pulse (wavelength=248 nm) was employed as an excitation light source. In a glove box filled with Ar, the obtained single crystal thin film and 0.2 g of $CaH_2$ powder were vacuum-sealed in a quartz tube and heat-treated at a temperature of 300° C. to 530° C. for one day to cause a hydrogenation reaction. As in Example 1, an unreacted $CaH_2$ and a by-product CaO that were attached to a product were removed by ultrasonic cleaning with acetone.

It was found from X-ray diffraction that the obtained sample was a single crystal thin film in which a perovskite crystal structure was maintained. It was found from the depth profile of thin films subjected to the hydrogenation reaction, the depth profile being measured by SIMS, that hydrogen was substantially uniformly distributed in all the thin film samples under the above-described heat treatment conditions. The composition in the case of M=Sr provided with reference data was found to be $SrTiO_{2.85}H_{0.15}$. The hydrogen contents of the thin film samples with M=Ba and Ca subjected to the same heat treatment were substantially the same as that of the case of M=Sr.

It was found from the depth profile measured by SIMS that, when the $MTiO_3$ (M=Ba, Sr, or Ca) single crystal thin film containing hydrogen (H) was kept in an atmosphere containing deuterium ($D_2$) at 400° C. for one hour, H in the $MTiO_3$ (M=Ba, Sr, or Ca) was completely substituted with $D_2$. As in Example 1, this phenomenon indicates that hydride ions are capable of being conducted in a thin film.

Figure 4:
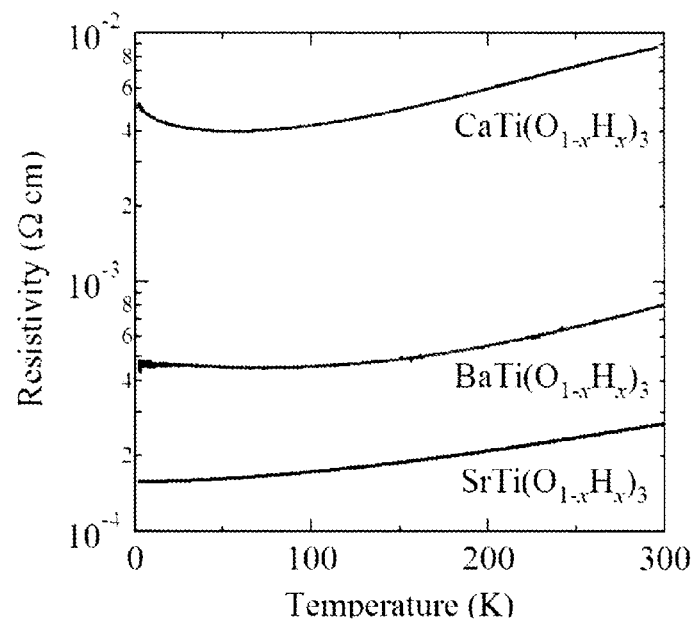
FIG. 4 illustrates change in the electrical resistances of single crystal thin films in Example 2 as a function of temperature.

FIG. 4 illustrates change in the electrical resistances of these samples as a function of temperature from 2 K to 300 K. The electrical resistances of all the samples decreased with decreasing the temperature, that is, all the samples exhibited metallic temperature dependence, except that the electrical resistance of the sample with M=Ca increased at a low temperature of 30 K or lower though the cause was unclear. The electrical resistivities of the samples with M=Ca, Ba, and Sr at room temperature were $8\times10^{-3}$ Ωcm, $8\times10^{-4}$ Ωcm, and $2\times10^{-4}$ Ωcm, respectively. In perovskite oxides, ion conduction is quite unlikely to occur at such a low resistivity at room temperature. This indicates that the $MTiO_3$ (M=Ba, Sr, or Ca) is a mixed conductor that exhibits not only hydride ion conduction at high temperatures, but also considerably high electron conduction.

EXAMPLE 3

Layered strontium titanate ($Sr_2TiO_4$ and $Sr_3Ti_2O_7$) particles having a particle size of about 200 nm and synthesized by a synthesis method that uses a solution, such as a citric acid method, were subjected to vacuum drying at 120° C. to sufficiently remove moisture attached to the surfaces of the particles. Subsequently, three equivalents of $CaH_2$ powder and the $Sr_2TiO_4$ particles or six equivalents of $CaH_2$ powder and the $Sr_3Ti_2O_7$ particles were mixed with each other in a glove box and molded into a pellet using a hand press. The pellet was inserted into a Pyrex (registered trademark) tube having an internal volume of about 15 $cm^3$ and vacuum-sealed. The sample was heat-treated at 480° C. for seven days. The sample after the heat treatment was washed with a 0.1 M $NH_4Cl$/methanol solution to remove a remaining unreacted $CaH_2$ and a by-product CaO.

The sample washed with a 0.1 M $NH_4Cl$/methanol solution showed dark blue as in the case of $BaTiO_{3-x}H_x$ or the like. The obtained sample was found to maintain a layered perovskite crystal structure from powder X-ray diffraction or powder neutron diffraction.

Figure 5:
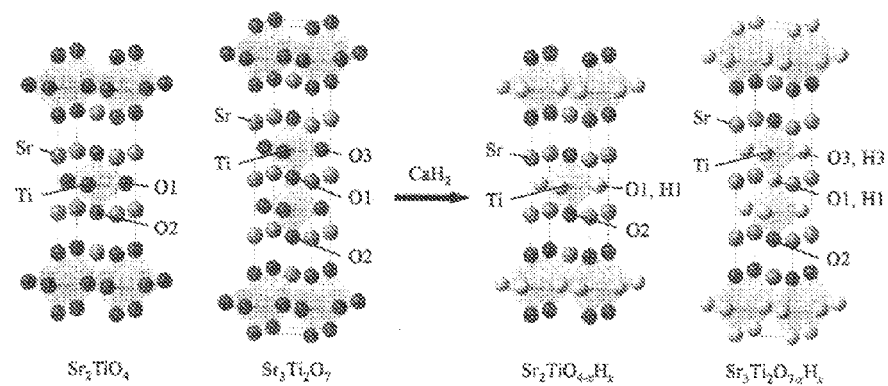
FIG. 5 illustrates the crystal structures (left) of $Sr_2TiO_4$ and $Sr_3Ti_2O_7$ before a heat treatment and the crystal structures (right) of the samples after the heat treatment in Example 3.

It was confirmed by Rietveld analysis that the obtained sample had the composition, $Sr_2TiO_{3.7}H_{0.3}$ or $Sr_3Ti_2O_{6.4}H_{0.6}$. Note that there is a possibility that less than 5 at. % of oxygen defects are present in the sample. It was confirmed by the quadrupole mass spectrometry and the thermogravimetric analysis that the oxygen content and the hydrogen content in the sample that were determined by the diffraction experiment were correct. FIG. 5 illustrates the determined crystal structure (right) of the sample after the heat treatment and the crystal structure (left) of the sample before the heat treatment. In the $Sr_2TiO_4$ and $Sr_3Ti_2O_7$ after the heat treatment, some of oxide ions are substituted with hydride ions.

Figure 6:
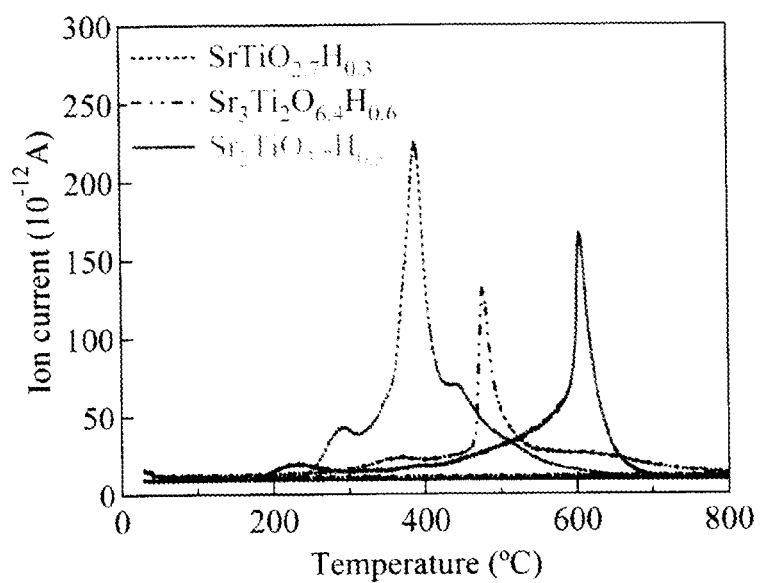
FIG. 6 illustrates change in the concentration of $H_2$ gas of the samples after the heat treatment in Example 3, the $H_2$ gas being detected with a quadrupole mass spectrometer.

FIG. 6 illustrates change in the concentration of $H_2$ gas detected with a quadrupole mass spectrometer when $Sr_2TiO_{3.7}H_{0.3}$ and $Sr_2Ti_2O_{6.4}H_{0.6}$ was heated from room temperature to 800° C. at 10° C./min while an argon gas was caused to flow at a flow rate of 300 mL/min. For comparison, $SrTiO_{2.7}H_{0.3}$ having a perovskite structure was also measured under the same conditions. FIG. 6 also shows the data. $SrTiO_{2.7}H_{0.3}$ has a maximum $H_2$ gas desorption at around 400° C. whereas $Sr_3Ti_2O_{6.4}H_{0.6}$ has a maximum $H_2$ gas desorption at around 480° C. and $Sr_2TiO_{3.7}H_{0.3}$ has a maximum $H_2$ gas desorption at around 620° C. This result shows that, in an inert atmosphere, strontium titanate having a layered structure can be stably present as an oxide-hydride at high temperatures compared with the perovskite strontium titanate.

EXAMPLE 4

Europium titanate ($EuTiO_3$) particles having a perovskite structure and synthesized by a complex polymerization method (citric acid method) in a reducing atmosphere were fired and then stored in a glove box to prevent the adhesion of moisture in the air. Three equivalents of $CaH_2$ powder and the $EuTiO_3$ particles were mixed with each other in a glove box and molded into a pellet using a hand press. The pellet was inserted into a Pyrex (registered trademark) tube having an internal volume of about 15 cm³ and vacuum-sealed. Three samples were heat-treated at a reaction temperature of 550, 575, and 600, respectively, for 48 hours to cause a hydrogenation reaction. The samples after the heat treatment were treated with a 0.1 M $NH_4Cl$ methanol solution to remove an unreacted $CaH_2$ and a by-product CaO that were attached to a product.

The color of the $EuTiO_3$ before the hydrogenation reaction was black, and the color of the samples washed with a 0.1 M $NH_4Cl$ methanol solution was also black. There was no difference in color in terms of reduction temperature. The obtained samples were found to maintain a perovskite crystal structure from powder X-ray diffraction. The sample before the heat treatment and the samples after the heat treatment had only a cubic crystal structure at room temperature.

Figure 7:
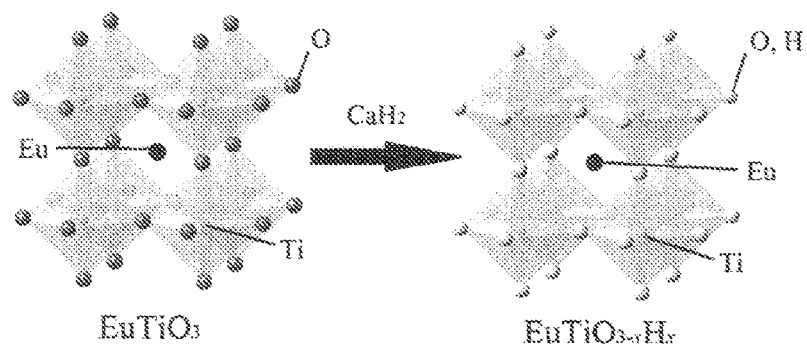
FIG. 7 illustrates the crystal structure (left) of $EuTiO_3$ before a heat treatment and the crystal structure (right) of the sample after the heat treatment in Example 4.

It was confirmed by Rietveld analysis of a radiation X-ray diffraction pattern that a sample obtained by hydrogenating europium titanate having a pyrochlore structure described below had a cubic perovskite structure and a composition of $EuTiO_{2.7}H_{0.3}$. It was confirmed by the quadrupole mass spectrometry and the thermogravimetric analysis that the oxygen content and the hydrogen content in the sample that were determined by the diffraction experiment were correct. FIG. 7 illustrates the determined crystal structure (right) of the sample after the heat treatment and the crystal structure (left) of the sample before the heat treatment. In the $EuTiO_3$ after the heat treatment, some of oxide ions are substituted with hydride ions.

When synthesis is performed in the air, europium titanate $Eu_2Ti_2O_7$ having a pyrochlore structure is obtained. It was found that the same hydrogenation phenomenon occurred when the same heat treatment conditions were applied, that is, up to about 20 at. % of oxygen in oxygen sites was substituted with hydrogen.

Figure 8:
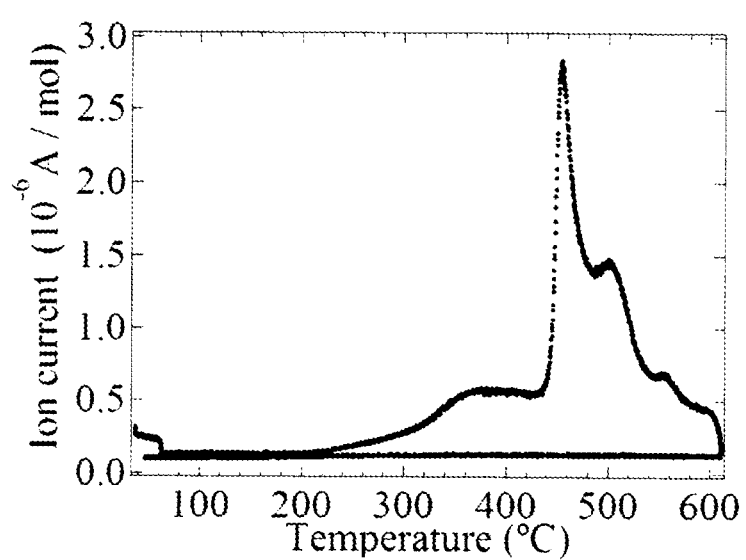
FIG. 8 illustrates change in the concentration of $H_2$ gas of the samples after the heat treatment in Example 4, the $H_2$ gas being detected with a quadrupole mass spectrometer.

FIG. 8 illustrates change in the concentration of $H_2$ gas detected with a quadrupole mass spectrometer when $EuTiO_{2.7}H_{0.3}$ was heated from room temperature to 600 at 10/min while an argon gas was caused to flow at a flow rate of 300 mL/min. The $EuTiO_{2.7}H_{0.3}$ has a maximum $H_2$ gas desorption at around 450.

INDUSTRIAL APPLICABILITY

The present invention provides a novel hydride ion/electron mixed conductor composed of a perovskite oxide containing titanium, which is an abundant element. The hydride ion/electron mixed conductor is promising as a mixed ion conductor composed of a ceramic material having characteristics that have not been realized in known oxide-ion conductors. The Ti-containing perovskite oxide-hydride of the present invention can also be used as a hydrogen absorption/desorption material.

The invention claimed is:

1. A mixed conductor having hydride ion conductivity and electron conductivity, comprising perovskite oxide having hydride ion conductivity, wherein 1 at. % or more of oxide ions contained in a titanium-containing perovskite oxide are substituted with hydride ions ($H^-$).

2. A method for manufacturing a powder of the mixed conductor according to claim 1, the method comprising:
   preparing a titanium-containing perovskite oxide powder as a starting material; and
   keeping the titanium-containing perovskite oxide powder together with a powder of an alkali metal or alkaline-earth metal hydride selected from lithium hydride (LiH), calcium hydride ($CaH_2$), strontium hydride ($SrH_2$), and barium hydride ($BaH_2$) in a temperature range of 300° C. or higher and lower than a melting point of the hydride in a vacuum or an inert gas atmosphere to substitute some of oxide ions in the oxide with hydride ions.

3. A method for manufacturing a thin film of the mixed conductor according to claim 1, the method comprising:
   preparing a titanium-containing perovskite oxide thin film as a starting material; and
   keeping the titanium-containing perovskite oxide thin film together with a powder of an alkali metal or alkaline-earth metal hydride selected from lithium hydride (LiH), calcium hydride ($CaH_2$), strontium hydride ($SrH_2$), and barium hydride ($BaH_2$) in a temperature range of 300° C. or higher and lower than a melting point of the hydride in a vacuum or an inert gas atmosphere to substitute some of oxide ions in the oxide with hydride ions.

4. A hydrogen electrode, a hydrogen permeation membrane, or a hydrogen gas sensor using the mixed conductor according to claim 1.

5. A hydrogenation catalyst using the mixed conductor according to claim 1.

6. A hydrogen absorption/desorption material using the mixed conductor according to claim 1.

* * * * *